United States Patent [19]

Cheng

[11] Patent Number: 5,197,509
[45] Date of Patent: Mar. 30, 1993

[54] LAMINAR FLOW ELBOW SYSTEM AND METHOD

[76] Inventor: Dah Y. Cheng, 12950 Cortez La., Los Altos Hills, Calif. 94022

[21] Appl. No.: 534,146

[22] Filed: Jun. 6, 1990

[51] Int. Cl.⁵ ............................................. F17D 1/20
[52] U.S. Cl. ........................................ 137/13; 137/8; 138/37; 138/39; 181/227
[58] Field of Search .............. 138/108, 37, 39; 137/8, 137/13; 73/865.9, 861.42, 46, 49.5, 707, 714, 756, 866.5; 251/126; 181/196, 224, 227, 233

[56] References Cited

U.S. PATENT DOCUMENTS

| | | | |
|---|---|---|---|
| 1,974,109 | 9/1934 | Higley | 137/112 |
| 1,974,110 | 9/1934 | Higley | 137/112 |
| 3,219,046 | 11/1965 | Wough | 137/8 |
| 3,724,499 | 4/1973 | Huniu | 137/615 |
| 3,827,461 | 8/1974 | Gilman | 138/37 X |
| 3,934,614 | 1/1976 | Elek et al. | 138/44 |
| 3,945,402 | 3/1976 | Murphy | 137/8 X |
| 4,080,997 | 3/1978 | Biornstad | 138/37 |
| 4,130,173 | 12/1978 | Looksey | 138/37 X |
| 4,232,710 | 11/1980 | Gallo et al. | 137/615 X |
| 4,309,146 | 1/1982 | Hein et al. | 415/4.2 X |
| 4,522,058 | 6/1985 | Ewing | 138/108 X |
| 4,581,048 | 4/1986 | Svoboda | 55/185 |
| 4,596,586 | 6/1986 | Davies et al. | 55/52 |
| 4,821,768 | 4/1989 | Lett | 138/37 X |
| 4,824,614 | 4/1989 | Jones | 138/37 X |
| 4,898,512 | 2/1990 | Geffs | 415/117 X |

FOREIGN PATENT DOCUMENTS

| | | | |
|---|---|---|---|
| 35853/89 | 12/1989 | Australia . | |
| 156269 | 10/1985 | European Pat. Off. . | |
| 2140419 | 3/1977 | Fed. Rep. of Germany . | |
| 2218494 | 9/1974 | France . | |
| 29113 | 2/1982 | Japan | 137/8 |
| 143214 | 7/1985 | Japan | 138/37 |
| 160614 | 7/1986 | Japan | 138/37 |
| 887821 | 12/1981 | U.S.S.R. . | |
| 1312298 | 5/1987 | U.S.S.R. | 138/39 |
| 774033 | 5/1957 | United Kingdom | 138/37 |
| 2041477A | 9/1980 | United Kingdom . | |
| 2146139 | 4/1985 | United Kingdom | 138/37 |

*Primary Examiner*—Tom Noland
*Attorney, Agent, or Firm*—Limbach & Limbach

[57] ABSTRACT

A means and method of design and installation of a pre-rotator ahead of an elbow are disclosed in order to eliminate or reduce elbow-induced turbulence in pipe flows. Experimental verification was conducted, and noise and pressure loss for flow around the elbow can be substantially reduced.

18 Claims, 7 Drawing Sheets

FIG. 8A $$C_o = \frac{30}{R_{ed}}$$

$$F_D = 15\, \rho_f\, V_f^2\, \frac{\pi d^2}{R_{ed}}$$

$$F_{c.f.} = \rho_s\, \frac{4\pi d^3}{3}\, \frac{V_f^2}{R_{30}}$$

$$R_{ed} = \frac{\rho_s\, \frac{4\pi d^3}{3}\, \frac{V_f^2}{R_{30}}}{15\, \rho_f\, V_f^2\, \pi d^2}$$

$$= \left(\frac{4}{45}\right)\left(\frac{\rho_s}{\rho_f}\right) \frac{d}{R_{30}} < 100$$

FIG. 8B

LAMINAR FLOW ELBOW SYSTEM AND METHOD

BACKGROUND OF THE INVENTION

A new flow system is invented to remove or to reduce flow separation and its induced turbulence and cavitation.

BACKGROUND-DESCRIPTION OF PRIOR ART

Turbulence created in pipe elbows causes increased erosion, noise, vibration, and stress cracking. If an elbow is located too close to a check valve, it can cause chattering and damage to the valve seat. In the case of a nuclear power plant, it can threaten the safety of the plant. In a condenser cooling system, the turbulence causes uneven flow in the cooling water box, in turn reducing the heat transfer effectiveness. Erosion of an elbow in a wet steam line or in refinery piping carrying catalyst particulates can cause unexpected down time. In nuclear power plants, sometimes a double blanket "tee" is used to dampen the fluid impact during turns. Others have used a Vortex ball to absorb the impact energy in areas which normally have a high rate of erosion. Thickening the wall and using stainless steel 316, Titanium and Chrome-Moly are common patch-up solutions currently. Other methods of turning vanes in wind tunnels and critical flow systems are required to eliminate some of the large-scale turbulence, but small-scale turbulence still exists. The methods in prior art may make the pipe system more safe or elongate the maintenance period, but the inherent problems of elbow-induced turbulence have never been removed. This is a very complicated fluid mechanics problem which involves potential flow, compressibility, and viscous flow. The turbulence is a result of rotation of the flow by the elbow, with the law of nature trying to return to a homogenized state in a short time. The prior art "fixes" did not address the cause of the turbulence; hence, have not been very successful.

SUMMARY OF THE INVENTION

My invention resulted from theoretical study and by reducing the problem to a geometrical problem known as rotational transformation in a magnetic confinement system of plasmas, first incorporated in the Stellarator, and used in many other areas of magnetic geometry with a stable plasma confinement. My invention recognizes the mathematic similarity of fluid flow streamlines and magnetic flux lines and their associated problems. When a magnetic flux tube is bent with a certain radius of curvature, the inner radius will have magnetic flux compressed, and the outer radius expanded. This induces a phenomena called Gradient (B). Plasma confined in such a field will be lost in a phenomena called Gradient (B) drift. This plasma with its loss of pressure and directed kinetic energy is similar to fluid flow and its elbow-induced turbulence. The rotational transformation in a magnetic field is a mathematic solution in that the magnetic flux is being rotated about the flux tube axis so that the flux lines going through a bend will have equal length.

In fluid flow, viscosity and pressure head are involved. The rotational transformation as invented here requires a pre-rotator before the fluid enters the elbow. The invented system is called the Cheng Laminar Flow Elbow System, which consists of a pre-rotator and a matched elbow as a set. The pre-rotator is designed so that the flow streamlines going through the turn of an elbow will have equal length. The objectives of the present invention are:

(a) to reduce elbow-induced turbulence;
(b) to reduce pressure loss through an elbow;
(c) to provide a uniform flow field so that no acceleration or deceleration will be induced, most important in two-phase flow or particle laden flow streams;
(d) to remove cavitation and erosion in pipe flows;
(e) to increase pipe flow efficiency; and
(f) to increase the quietness of piping systems.

The advantages of the present invention are:

(1) The system has no moving parts.
(2) The system is independent of fluid flow velocity.
(3) The system is rigid and has little blockage to the flow.
(4) The system can be monitored for effectiveness in pressure drops of the elbow and across the pre-rotator.
(5) The system in larger pipe sizes can be installed on site.
(6) The system reduces turbulence-induced vibration and stress cracking of pipes.
(7) The system reduces erosion of pipe in two-phase flow.
(8) The system increases pressure loss in the reverse direction; therefore, reduces water hammer problem.

DETAILED DESCRIPTION OF THE PREFERRED EMBODIMENTS

Figures 1, 1A:
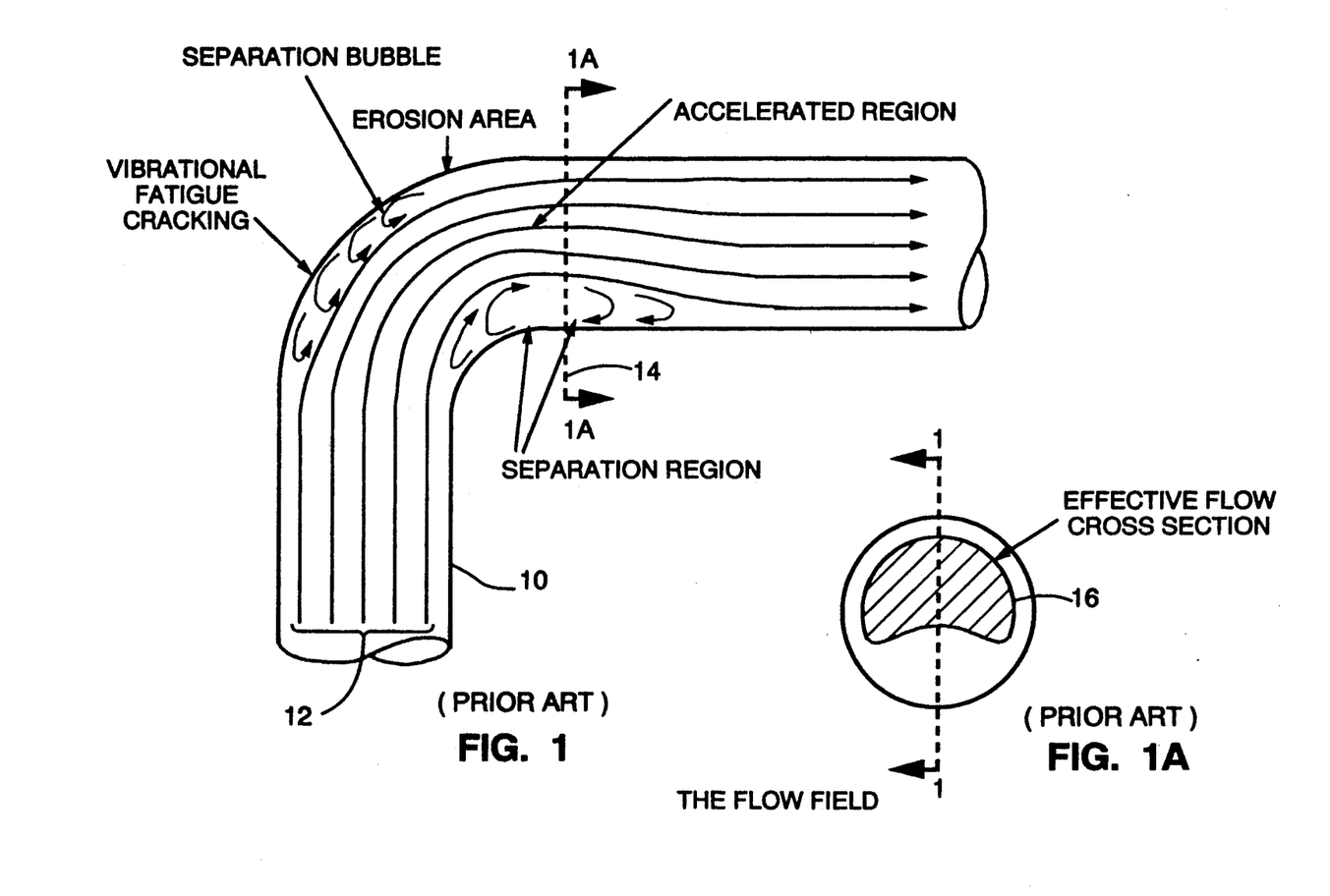
FIG. 1 is an illustration of the actual flow streamline as viewed in experimental photographs of injected dye flowing through pipes and FIG. 1A is a sectional view of the pipe shown in FIG. 1.

FIG. 1 illustrates the streamlines inside a pipe with an elbow. The streamline shape was photographed through a movie picture, and the streamlines were injected with colored dyes in a transparent Lucite pipe 10. The streamlines are bunched together at 12. As we can see, the streamlines are separate from the wall in the upper corner, and also separate from the wall on the inside corner. The cross section of the pipe 14 downstream Of the elbow is depicted as cross section A/A. Cross section A/A is the smallest area the flow has contracted to.

The cross sectional view of the pipe is shown separately in FIG. 1a. The shaded area 16 is shaped like a half moon. The contraction is similar to an orifice plate, and the streamline pulling from the outside wall of the pipe had never been observed by anyone prior to our experiment. The reason the streamline is pulling away from the outside wall is because the contraction due to acceleration of the fluid through a smaller area has to follow a certain streamline pattern, and the acceleration to the small area causes the fluid to separate from the outside wall. This separation region also causes accumulation of droplets and particulates, and is damaging to pipes. The separation of the inside wall of the elbow generates turbulence, cavitation, stress and noise downstream of the elbow. These two separation regions and the necessity for their removal was the focus of my invention.

Figures 2A, 2B:
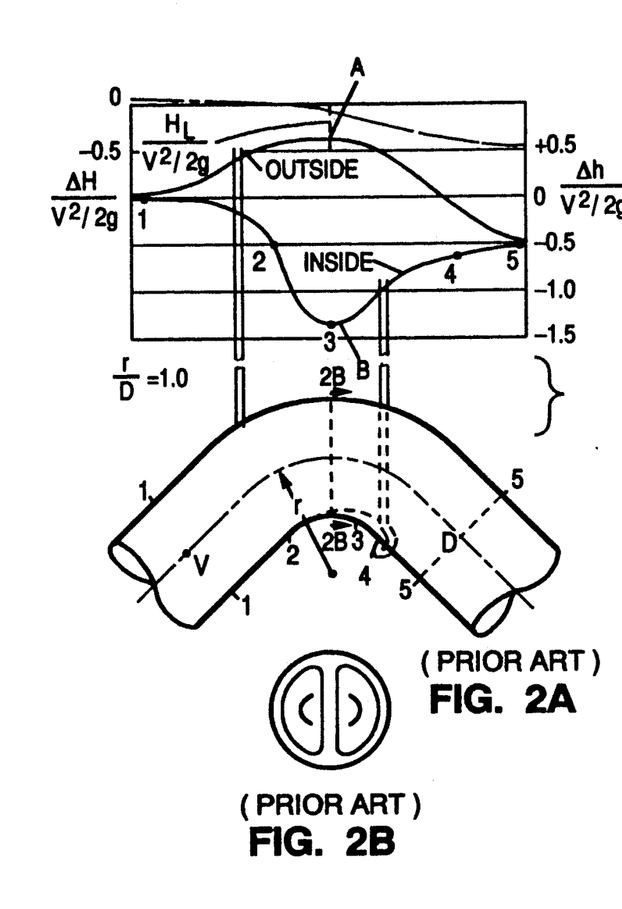
FIG. 2 is an illustration of pressure distribution and secondary flow in a 90° turn elbow and its pressure distribution at the outer wall of the elbow and the inner wall of the elbow to indicate the cause of induced secondary flow in the separation.

FIG. 2 further illustrates the pressure measurement across the inner and outer wall of an elbow through a liquid fluid at a relatively high speed. The elbow pressure is measured at the locations on the inside wall labeled 1, 2, 3, 4, 5; and on the outside wall labeled as 1, A and 5. Here B coincides with position 3. The cross section AB is shown at the bottom of FIG. 2. The pressure distribution measured was a classical case; for instance, the outside of the pipe on the upper part of the curve, which is normalized by the kinetic head and pressure head, starts at 1, and increases to a higher level at point A. This is due to the stagnation and the centrifugal force, which then accelerates the fluid from A to position 5; therefore, the pressure drops dramatically. This acceleration is due to the contraction of the fluid after the elbow. On the other hand, the pressure distribution on the inside of the elbow turn starts from point 1, gradually decreases to point 2, then to a minimal point 3, then recovers to point 4 and point 5. This low-pressure dip relative to the position at the opposite side, point A, creates a very large pressure gradient, which is the reason the droplets or other particulates can be accelerated by this pressure gradient to hit the wall and cause erosions. Also, the drop in pressure will cause cavitation if the fluid contains low volatile materials rather than a pure gas.

Figure 3:
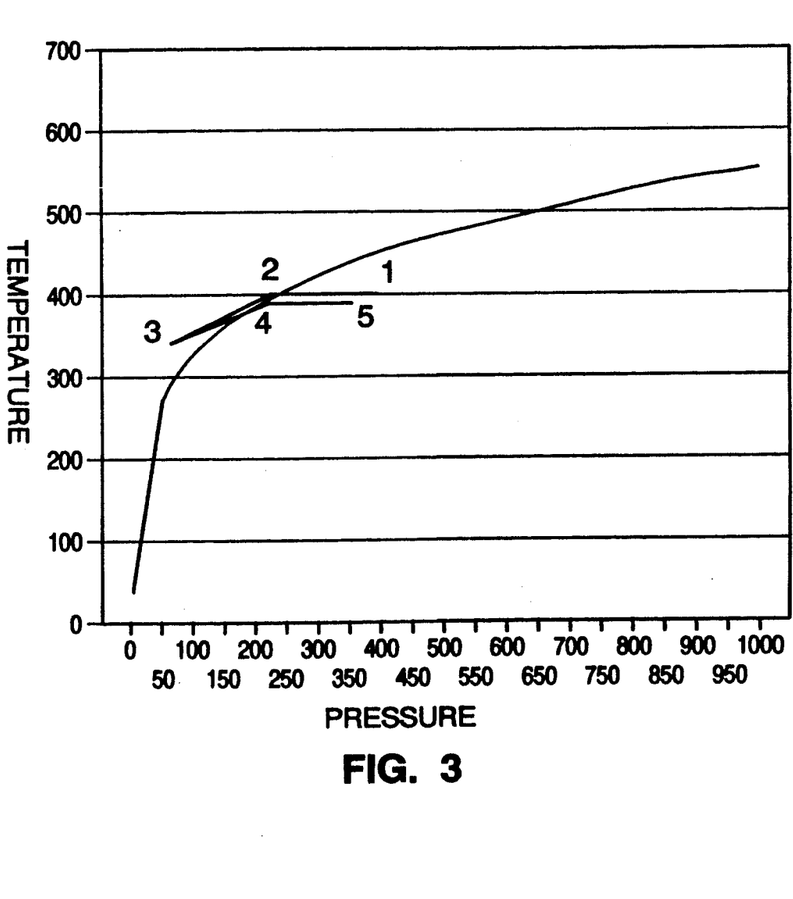
FIG. 3 is an illustration of sub-cooled water feed pumps through an elbow that go through a vapor phase cavitation and recovery cycle in accordance with FIG. 2.

At point 1, the water pressure is high; therefore, it's called subcooled water below the boiling temperature of the fluid. The pressure and the boiling temperature curve is shown as a curve separating the points 1, 2, 3, 4, 5. The points 1, 2, 3, 4, 5 correspond to the points 1, 2, 3, 4, 5 in FIG. 2. When the pressure is dropped from point 1 to point 2, which reaches the boiling temperature of the water under a lower pressure, the water is ready to be flashed into steam, which will continue to drop the pressure to point 3, which is clearly the vapor and steam phase. This is known as cavitation. It could happen not necessarily in a heated water situation. It is also caused by dissolved gas in water. The pressure is then recovered from point 3 to reach the condensation point under a lower temperature at point 4, then point 2. Because some of the latent heat is consumed during the evaporation, the temperature is dropped dramatically from point 2 to point 3, and usually the temperature fluctuates in that separation region. The pressure is continually recovered from point 4 to point 5 to complete the whole turn of the fluid through the elbow. However, the damage of the elbow is created in the region of point 2 to point 3, and point 3 to point 4, which not only has cavitation, but also temperature turbulence fatigue, which causes temperature stress fatigue and also chemical stress fatigue.

Figure 4:
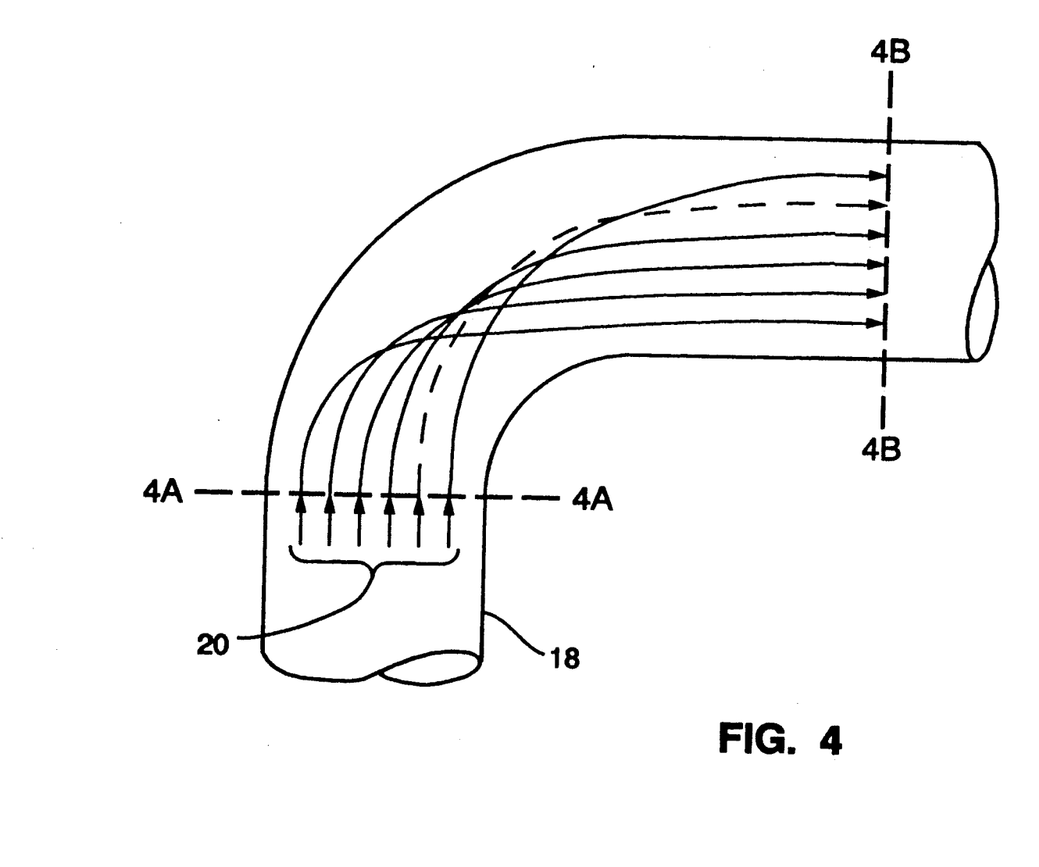
FIG. 4 is an illustration of equal streamline length flow desired to achieve rotational transformation mathematically.

In FIG. 4, the elbow system 18 would require a different streamline pattern a depicted by 20. The streamline would require the same length starting from cross section AA, and would reach cross section BB at the same time and at the same velocity by designing a pre-rotational flow according to the rotational transformation formula. In general, the streamline is more complicated than this; however, this illustrates a typical 90 degree turn elbow only. A feature of the pre-rotator under the rotational transformation rule is that the streamline started on the outermost wall of the pipe, after going through the elbow, reaches the innermost wall of the elbow, and the streamline on the innermost wall of the elbow will reach the outermost position after going through the elbow. The inside streamlines generally have no change in position; in other words, no rotation occurs at the center lines. It was demonstrated later by the pre-rotator design, according to rotational transformation, that if the turning vane is designed properly, the fluid will have a rotation above the center line and also perpendicular to the center line, creating a compound curve to compensate for the rotation due to the elbow. The reason it requires two components of rotation to compensate for one rotation is due to the vector analysis of three-dimensional Curl functions. The Curl function requires the cross product of a vector, normally consisting of two terms; therefore, the pre-rotator has to be designed accordingly to make the total compensation work. Experimentally, my invention shows that when the pre-rotator is properly designed, the fluid is pre-rotated entering the elbow and going through the elbow, reaching position BB. From thereon, the fluid stops rotation all by itself, and the fluid in the pipe is going straight beyond that point. In other words, turbulence is not generated through the elbow, and cavitation on the inside and outside is totally eliminated. The velocity of the fluid going through the elbow maintains a constant pace without acceleration or deceleration, which is the main cause of the droplets carried by the fluid to be separated from the main bodies.

Figure 5A:
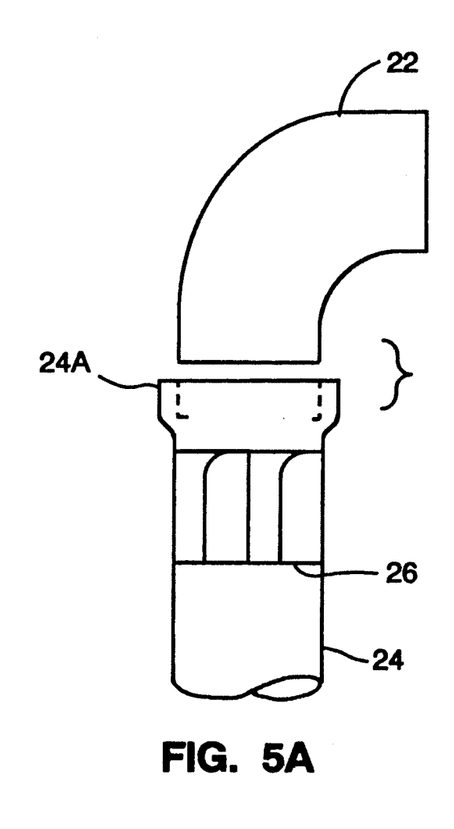
FIGS. 5A–5C, hereafter collectively referred to as FIG. 5, illustrate the pre-rotator ahead of the elbow and the mathematical relationship between the turning radius, the pipe diameter and the total angle of turns.
Figures 5B, 5C:
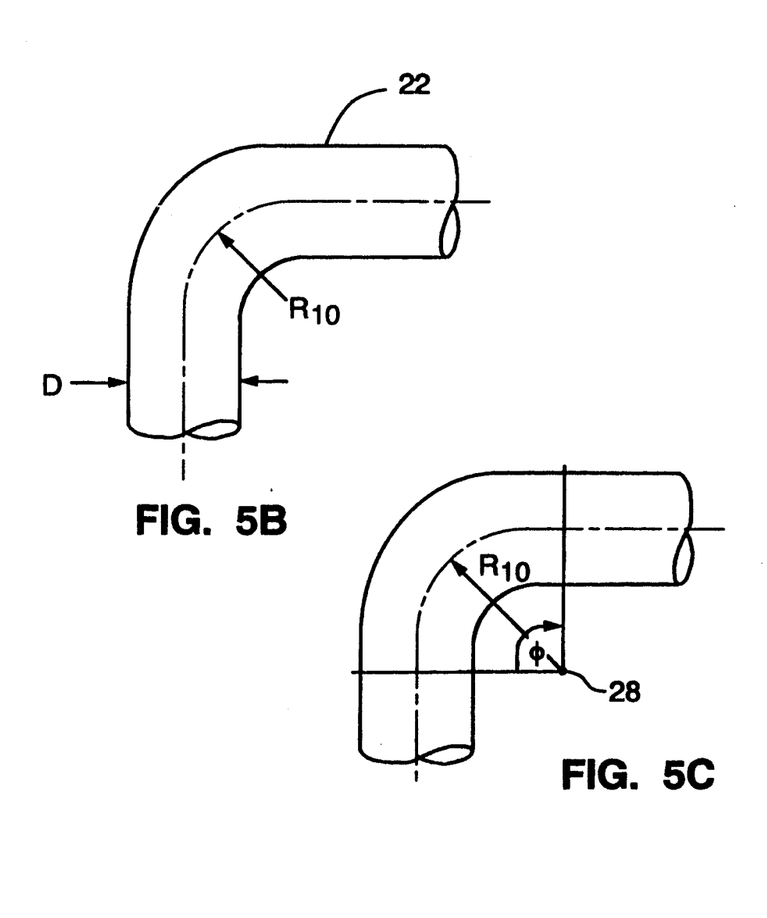

FIG. 5 is an illustration of the pre-rotator and its relationship to the, elbow turns. The pre-rotator 26 is located in the pipe 24 ahead of the elbow 22 connected to pipe flange 24A. The relationship of the turning angle will be shown later; however, the relationship relates to the geometry of the elbow 22 according to the diameter of the elbow D and the turning radius $R_{10}$. 28 is the center of the rotation of the elbow.

Figure 6A:
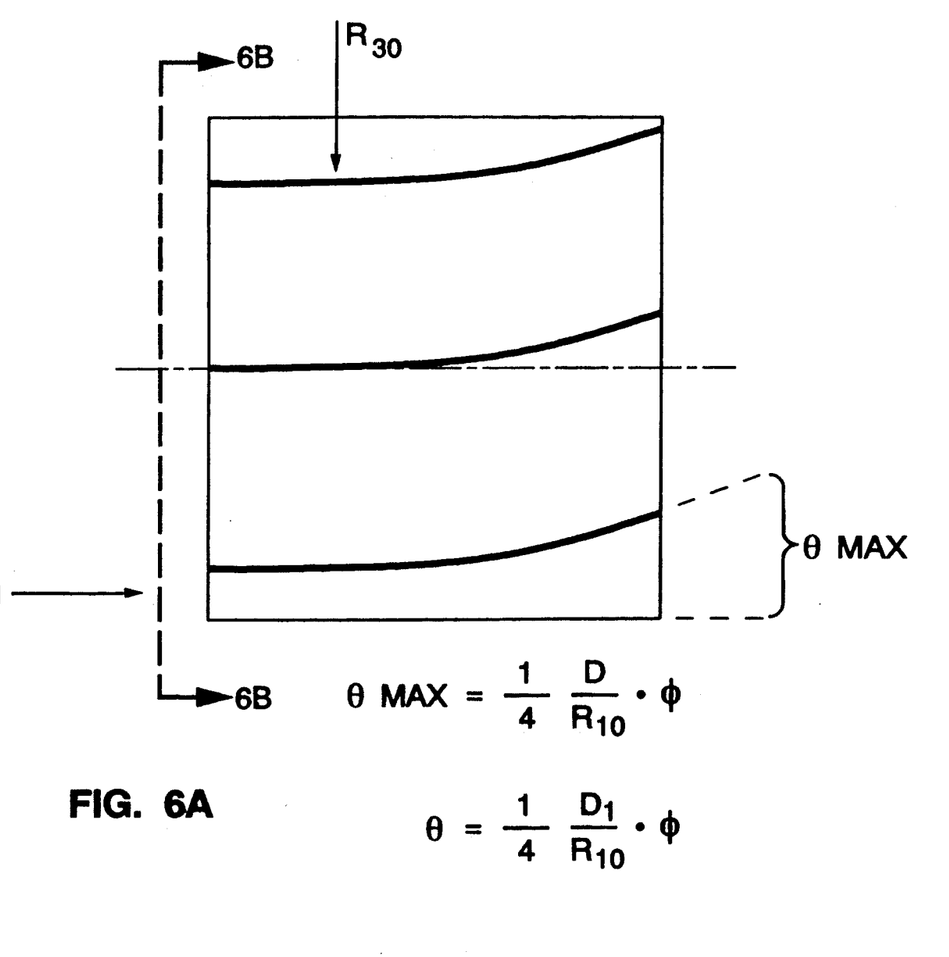
FIGS. 6A and 6B, hereafter collectively referred to as FIG. 6 illustrate a head-on and side view of a prerotator according to a rotational transformed solution that totally compensates the rotation induced by elbow flows.
Figure 6B:
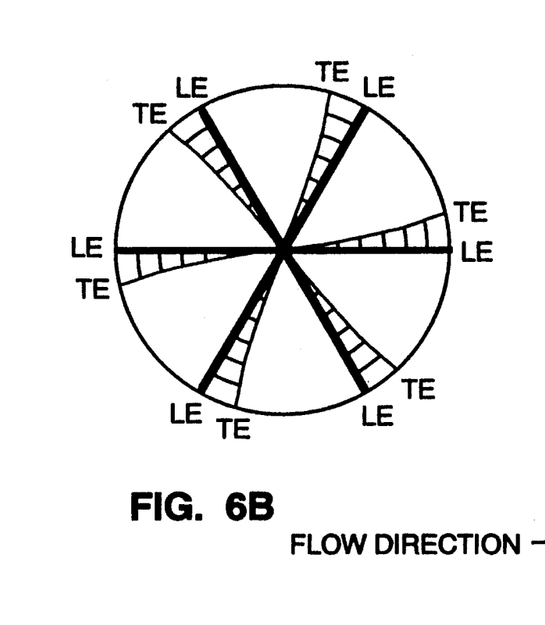

FIG. 6A illustrates the results of a typical geometry viewed in the direction of the fluid flow, and also on the side. As one can see by the direction of the fluid flow, as shown in FIG. 6B, wherein the fluid flowing through a pipe has a central axis the turning vanes which are symmetrically oriented around the fluid flow axis, each vane has a compound curvature that is a result of the rotation in the axial direction and also in the R direction. In the axial direction, the angle is called a Theta, and on the side view, we can see the fluid goes into the turning vane without any angle of attack, coming out with a maximum angle of turn, Theta max, and the radius for the fluid to reach the Theta max is called $R_{30}$. According to simplified mathematical calculations under rotational transformation, the Theta max is equal to one quarter the pipe diameter divided by the radius of the turn ($R_{10}$) times the total inclusion angle of the turn (Phi). For any angle in between the center line to the outer edge (Theta 1), simply substitute the pipe diameter with the appropriate diameter (D1). The projected view would have a compound curve, as shown in cross section AA. The radius of curvature $R_{30}$ is arbitrary if no two-phase flow problem is considered. It is also a critical design parameter when wet steam is flowing through the turning vane. Separate droplets or particles will be carried by the stream under a relatively small velocity to the stream, called a slip stream, such that the centrifugal force should be smaller than the slip stream so the particles will be rotating with the fluid instead of separating from the streamline and hitting the wall. The radius ($R_{30}$) relates to the maximum diameter of the particle the stream is carrying.

Figure 7A:
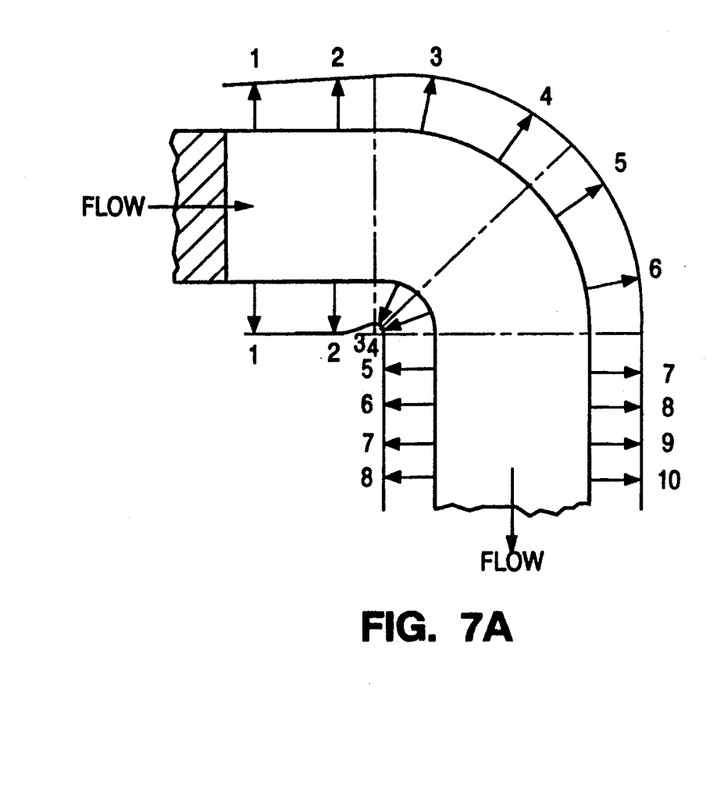
FIGS. 7A and 7B, hereafter collectively referred to as FIG. 7, illustrate the comparison of an elbow with rotational turning vane versus without rotational turning vane as real experimental results from a reduction in practice.
Figure 7B:
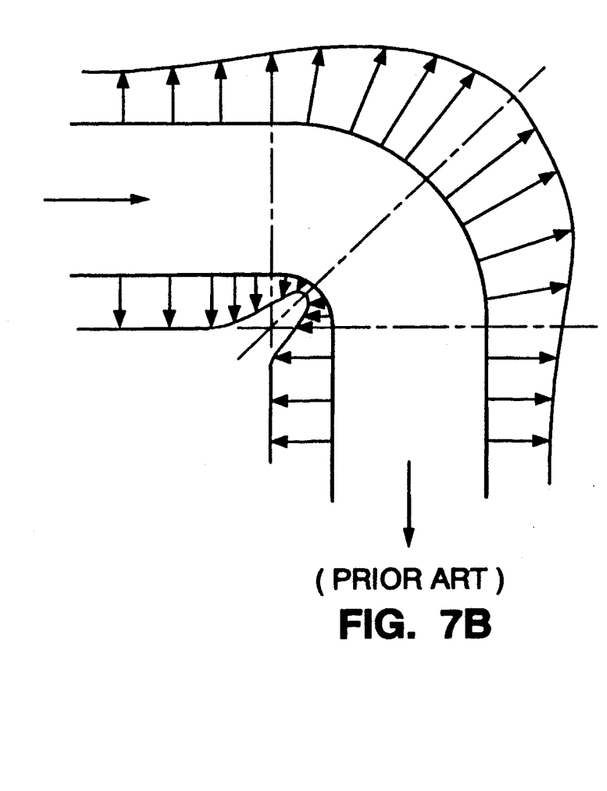

FIG. 7 is a set of actual experimental measurements of the same elbow with and without rotational transformed turning vanes ahead of the elbow. 7a is the pressure distribution measured on the inside and outside wall of the elbow. The pressure is measured by pressure taps and manometer boards. It can be shown that the pressure distribution is very uniform from the inside and outside of the pipe flows, in contrast to FIG. 7b, where the pressure is increased on the outside wall and is also creating almost a suction on the inside wall. This is the classical case as depicted in FIGS. 2 and 3. On the other hand, 7a's deviation in pressure through the elbow has been totally removed. The pressure loss of flow in an elbow is usually measured in the industry in terms of the equivalent pipe length for the same pressure loss according to the diameter of the pipe. Typical pressure losses for industrial application flow Reynolds numbers in an elbow are equivalent to a 30 diameter length of straight pipe. On the other hand, in the case of 7a, the pressure loss is almost the same as a straight pipe; therefore, an equivalent length of pressure loss is significantly reduced. This not only saves energy in plant operations, but removes the turbulence it generates and the cavitation and other things causing a piping system to be damaged. This certainly has consequences of saving energy and creating safety for thermal power plants, as well as nuclear power plants.

Figure 8A:
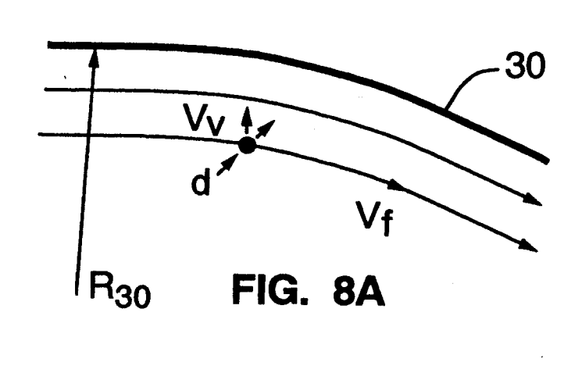
FIG. 8 is a description of the turning vane angle and the radius of the turning vane relating to the diameter of the particulate size or steam droplet size and the flow velocity such that the particle will not be separated from the main flow.
Figure 8B:
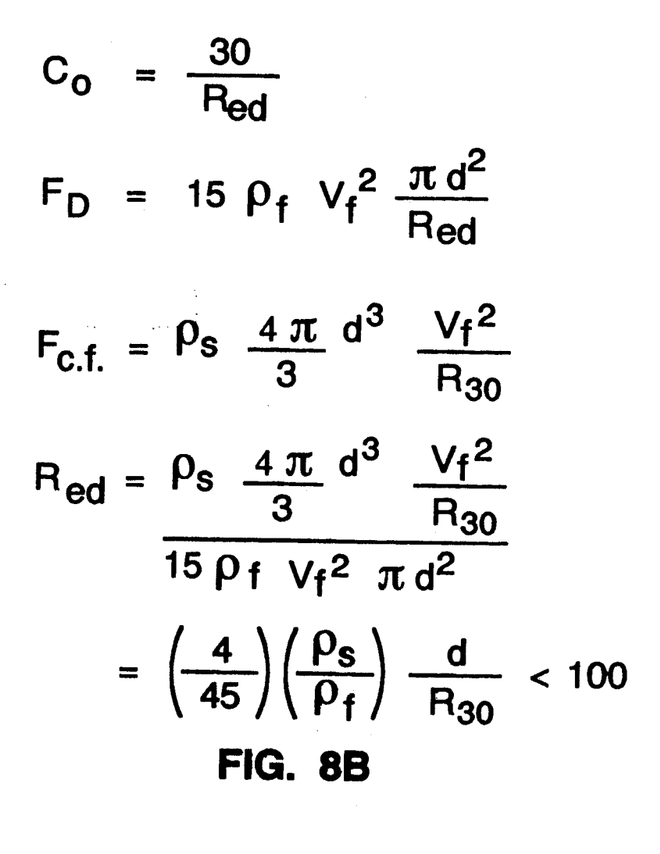

FIG. 8 shows the section of a turning vane 30 at the maximum turning angle. The turning radius is $R_{30}$. The velocity of the flow stream is $V_f$, and the diameter of the largest particle or droplets carried by the stream is d. The relative velocity going across the streamline is $V_r$. The radius $R_{30}$ is designed such that the largest particle carried by the stream will not hit the wall, or at least will minimize the percentage of the largest droplet carried by the fluid to hit the turning vane wall. Mathematically, the reason the particle can be carried by the bulk of the stream is that the relative velocity of the particle and the stream is very small. The viscous force, which is the reason that the particles are carried by the fluid stream, can be quantified through the drag coefficient, as measured by the Reynolds number, based on the relative streams and the diameter of the particles. The larger the Reynolds number, the smaller the drag forces. The Reynolds number is a function of the density, the velocity and the particle diameter divided by the viscosity of the fluid; therefore, basically the formula as given is that the drag coefficient in the region allows particles to be carried by the stream, called Stoke's flow regime. The drag coefficient ($C_o$) is equal to 30 divided by the Reynolds number ($R_{ed}$). The drag force is equal to 15 times the density of the fluid ($\rho_f$), the main velocity of the stream ($V_f^2$) times Pi, times the diameter (d) of the particulates squared, divided by the Reynolds number ($R_{ed}$). Basically, this sets up a very unstable situation such that the larger the Reynolds number, the smaller will be the drag forces. In other words, the particulate can be carried by the stream as long as the relative velocity of the particles with respect to the fluid is small. When the particle is accelerated away from the stream, the relative velocity becomes increased, and the Reynolds number also is increased. This in turn reduces the drag forces to hold onto the particle, which can cause an unstable runaway situation. The centrifugal force, however, caused by the turning vane can be shown in the equation as $F_{c.f.}$ equals the density of the particulates ($\rho_s$) times 4 Pi divided by 3, the diameter cubed times the relative velocity squared divided by the radius of curvature of the turning vane ($R_{30}$). If the Reynolds number chosen still has a relatively large viscous force to retain the particles, then we can determine the relationship between the diameter and the turning radius of the vane designs. If we equate the viscous force drag and the centrifugal force to obtain a Reynolds number, we will find the equation as shown should be less than 100 to retain the relatively high viscous forces within the Stoke's flow regime. This Reynolds number, it turns out, is independent of the flow stream velocity, but is equal to the density of the solid to the density of fluid ratio, and the particulate size divided by the turning radius ($R_{30}$). This will be the criteria I use to design the turning vanes for two-phase flow.

As is evidenced from the description of the figures, a number of the drawings were derived from actual experimental test results, and from those results, the advantage of my invention becomes obvious. For example, through my design, the rotational transformed turning vane is a geometrical effect independent of the velocity of flow through the pipe system; therefore, the turning angle does not have to be changed in various operations of higher or lower velocities within the same pipe system. On the other hand, it also is true that the turning vane design is not an arbitrary design such that just rotating some fluid flow with certain plates would make the whole system work. The system has been tested in water tunnels extensively with a velocity range varied to a factor of 100. It definitely shows that the separation region of the elbow has been totally removed and the turbulence induced by the pipe flow has been removed. This in turn reduces the contraction area or removes the contraction area downstream of the elbow, hence, it reduces the pressure loss caused by flow through an elbow. It is also known that if the turning angle is larger than desired, then the fluid will continue to rotate after the elbow. On the one hand, the cavitation and the pressure loss due to the elbow is being removed; and on the other hand, the blockade due to the turning vanes is increased, so the turning vane design will have a trade-off between the pressure loss across the turning vane versus pressure reduced from removing the contraction area of the turning vane. Therefore, the maximum turning angle should be based on the formula given as follows:

$$\text{Theta Max} = \tfrac{1}{4} D/R_{10} \times \text{Phi}$$

Therefore, the maximum turning angle should not be more than what I have recommended. However, due to the trade-off of pressure losses, the maximum turning angle can be less than what I have shown in the formula. If the fluid is highly viscous or of very high velocity, then a careful trade-off between the pressure loss induced by the turning vane versus pressure reduction due to the turning vane would have to occur. It is also shown that the turning vane design is a compound surface whereby the fluid is rotated about the axis, and in the meantime, rotating perpendicular to the axis. The entrance into the rotation perpendicular to the axis will depend on the droplet size criteria, so a gentle entrance curve is recommended. The surprising results due to the flow in the reverse direction with this turning vane are that the fluid will experience angle of attack on entrance, therefore causing more resistance, making the piping system seem like a one-directional flow device. This has a benefit of reducing the water hammer effect caused by sudden increase or sudden drop or close of valves downstream of pipe systems.

SUMMARY, RAMIFICATIONS AND SCOPE

The summary of my invention is the discovery under the fundamental fluid dynamic principle that under the rotational transformation calculation of Curl function, that a turning vane can be designed to compensate the forced rotation of fluid through an elbow. The geometrical relationship of the turn in terms of the diameter of the pipe and the turning radius therefore relating to the turning vane design has been an important discovery, and verification experimentally has borne the theory out. The scope of the invention is trying to eliminate cavitation, turbulence induced by the elbow flow, erosion due to these phenomena in pipe flows, and application to two-phase flows that the fluid can carry droplets or particulates in its streams. The scope of the invention is not only to reduce the pressure loss and increase the energy efficiency of pipe systems, but also to reduce noise generated and the weight of the piping systems, and enhance the safety of such systems.

I claim:

1. A pipe section comprising:

a substantially straight pipe section defining a fluid flow path, said straight pipe section being adoptable for inclusion prior to a curved pipe section;

means for imparting rotation to said fluid before passing through the curved pipe section, said rotation imparting means being fixed within said straight pipe section; and wherein said rotation imparting means imparts sufficient rotation to the fluid to minimize turbulence as it passes through the curved pipe section while insuring that the fluid rotation substantially terminates upon exiting from the curved pipe section.

2. The pipe section of claim 1 wherein said rotation imparting means includes at least one vane having a curvature and wherein the angle of curvature is a function of the diameter of the straight pipe, the radius of curvature of the curved pipe section, and the inclusion angle of the curved pipe section.

3. The pipe section of claim 2 wherein the substantially straight pipe section is circular and has a wall and the angle of curvature theta of said at least one vane is defined as the angle of said vane to the wall.

4. The pipe section of claim 3 wherein the maximum angle theta of curvature of said at least one vane is approximately equal to one quarter of the straight pipe section's diameter multiplied by the inclusion angle of the curved pipe section and divided by the radius of curvature of the curved pipe section.

5. The pipe section of claim 3 wherein the maximum angle theta of curvature of said at least one vane does not exceed about one quarter of the straight pipe section's diameter multiplied by the inclusion angle of the curved pipe section and divided by the radius of curvature of the curved pipe section.

6. The pipe section of claim 1 wherein said rotation imparting means comprises a plurality of vanes, each having a curvature and generally symmetrically positioned about the center axis of the straight pipe section.

7. The pipe section of claim 6 wherein the plurality of vanes provides fluid rotation about the center axis and also generally perpendicular to the center axis to provide compensation for the fluid rotation in the curved pipe section.

8. The pipe section of claim 6 wherein the turning vanes have a leading edge and the turning vanes have no angle of attack at the leading edge.

9. In combination a pipe assembly comprising a curved pipe section defining a fluid flow path and the pipe section or claim 5 positioned prior to the curved pipe section.

10. The pipe assembly of claim 9 wherein the curved pipe section comprises a 90 degree pipe elbow.

11. A pipe elbow assembly for minimizing fluid turbulence comprising:

a pipe having a pre-elbow section, and an elbow section;

means for imparting rotation to the fluid before passing through the elbow section of the pipe, the rotation means being immobilized in the pre-elbow section of pipe;

wherein the rotation means includes at least one turning vane having a curvature, and wherein the pre-elbow pipe section is circular and has a wall, the elbow pipe section having an inclusion angle and a turning radius, the turning vane curvature having a maximum angle theta proximal to the pre-elbow pipe section wall, theta being approximately equal to one quarter of the pre-elbow pipe section's internal diameter multiplied by the inclusion angle and divided by the turning radius.

12. A pre-rotator for minimizing turbulence in fluid as it flows through a pipe elbow comprising:

means for imparting sufficient rotation to the fluid prior to entering the pipe elbow so that fluid turbulence in the pipe elbow is substantially eliminated;

means for immobilizing the rotation means in front of the pipe elbow in the fluid flow path;

wherein the rotation means includes a turning vane having curvature in the direction of fluid flow; and wherein the pipe is circular and the turning vane's curvature has a maximal angle theta proximal to the pipe, the pipe elbow having an inclusion angle and a turning radius, the angle theta being approximately equal to one quarter of the pipe's internal diameter multiplied by the elbow's inclusion angle and divided by the turning radius.

13. A pre-rotator for minimizing turbulence in fluid as it flows through a pipe elbow comprising:
means for imparting sufficient rotation to the fluid prior to entering the pipe elbow so that fluid turbulence in the pipe elbow is substantially eliminated;
means for immobilizing the rotation means in front of the pipe elbow in the fluid flow path;
wherein the rotation means includes a turning vane having a curvature in the direction of fluid flow; and
wherein the pipe is for transporting a fluid having a relative Reynold's number based on mainstream properties in density, viscosity, maximum particle diameter, and particle velocity relative to the mainstream media, such that 4/45 times the ratio of particle density to fluid density times particle diameter divided by turning vane curvature radius is less than 100.

14. A pre-rotator pipe section comprising:
a substantially straight pipe section defining a fluid flow path;
means for imparting non-turbulent rotation to a fluid which passes through the pipe section, the rotation means being immobilized inside the pipe section along the fluid flow path;
wherein the pipe has a core axis, the rotation means including a plurality of turning vanes, each vane having a leading edge with no angle of attack relative to the fluid flow path, the turning vanes being symmetrically disposed through and around the pipe's core axis; wherein each turning vane has a curvature in the direction of the fluid flow path, the pipe section having a wall, the turning vane curvature having maximum angle theta proximal to the pipe section wall; and
wherein the pre-rotator pipe section is circular and is adapted to be connected to a pipe elbow section having an inclusion angle and a turning radius, the turning vane maximum curvature angle theta being sufficient to turn the fluid about an angle which is approximately equal to one quarter of the pipe section's internal diameter multiplied by the inclusion angle and divided by the turning radius.

15. A pre-rotator for minimizing turbulence in a fluid as it flows through a pipe elbow which comprises:
(a) rotation means for imparting sufficient pre-rotation to the fluid prior to entering the pipe elbow so that fluid turbulence within the pipe elbow is minimized while insuring that the fluid rotation substantially terminates upon exiting from the pipe elbow; and
(b) means for immobilizing the rotation means just prior to and in front of the pipe elbow in the fluid flow path.

16. A method of reducing fluid turbulence in a fluid flow path as the fluid flows in a curved pipe section, which method comprises:
imparting sufficient rotation prior to the fluid before passing through the curved pipe section to minimize turbulence while providing that the imparted fluid rotation substantially terminates upon exiting from the curved pipe section.

17. The method of claim 16 which includes installing a fixed pre-rotation means directly in front of the curved pipe section.

18. The method of claim 16 which includes installing a plurality of generally symmetrical fixed vanes for the rotation of the fluid.

* * * * *